(12) United States Patent
Stiller et al.

(10) Patent No.: US 7,739,042 B2
(45) Date of Patent: Jun. 15, 2010

(54) WIRELESS ADDRESS AND STREET NAME LOCATOR

(76) Inventors: Sharon Stiller, Underberg & Kessler, 1800 Chase Sq., Rochester, NY (US) 14614; Nelson Adrian Blish, Eastman Kodak Company, 343 State St., Rochester, NY (US) 14650; Sierra Stiller-Saiger, 195 Canterbury Rd., Rochester, NY (US) 14607; Lou Horvath, 15 Bordom Heights, Rochester, NY (US) 14610

( * ) Notice: Subject to any disclaimer, the term of this patent is extended or adjusted under 35 U.S.C. 154(b) by 403 days.

(21) Appl. No.: 11/079,869

(22) Filed: Mar. 14, 2005

(65) Prior Publication Data

US 2006/0206259 A1    Sep. 14, 2006

(51) Int. Cl.
*H04B 7/00* (2006.01)

(52) U.S. Cl. .................. 701/211; 340/572.1; 340/933; 340/539.26; 235/385

(58) Field of Classification Search .............. 235/735, 235/385; 340/572.1, 988, 933, 438, 539.26; 702/184; 701/211; H04B 7/00; G01C 21/26
See application file for complete search history.

(56) References Cited

U.S. PATENT DOCUMENTS

| | | | | |
|---|---|---|---|---|
| 5,936,527 A * | 8/1999 | Isaacman et al. | ......... | 340/572.1 |
| 6,008,740 A * | 12/1999 | Hopkins | ....................... | 340/905 |
| 6,049,745 A * | 4/2000 | Douglas et al. | ............... | 701/23 |
| 6,278,936 B1 | 8/2001 | Jones | ......................... | 701/201 |
| 6,297,727 B1 * | 10/2001 | Nelson, Jr. | ................. | 340/10.1 |
| 6,405,126 B1 | 6/2002 | Palomo et al. | .............. | 701/202 |
| 6,411,896 B1 | 6/2002 | Shuman et al. | ............. | 701/209 |
| 6,560,529 B1 | 5/2003 | Janssen | ....................... | 701/200 |
| 6,600,418 B2 * | 7/2003 | Francis et al. | ............ | 340/572.1 |
| 6,714,121 B1 * | 3/2004 | Moore | ........................ | 340/10.3 |
| 6,836,724 B2 | 12/2004 | Becker et al. | ............... | 701/200 |
| 6,864,784 B1 * | 3/2005 | Loeb | ............................ | 340/441 |
| 6,937,747 B2 * | 8/2005 | Culp et al. | ................... | 382/113 |
| 7,019,650 B2 * | 3/2006 | Volpi et al. | ................ | 340/572.1 |
| 7,034,683 B2 * | 4/2006 | Ghazarian | ................ | 340/568.1 |
| 2002/0089434 A1 * | 7/2002 | Ghazarian | ................... | 340/988 |
| 2003/0057270 A1 * | 3/2003 | Collen | ........................ | 235/375 |
| 2003/0069815 A1 * | 4/2003 | Eisenberg et al. | ............ | 705/32 |
| 2003/0112126 A1 * | 6/2003 | Kubler et al. | ............. | 340/10.33 |
| 2003/0218551 A1 * | 11/2003 | Crocker et al. | .............. | 340/905 |
| 2004/0002305 A1 * | 1/2004 | Byman-Kivivuori et al. | ..... | 455/41.2 |
| 2004/0069850 A1 * | 4/2004 | De Wilde | ..................... | 235/385 |
| 2004/0164140 A1 * | 8/2004 | Voeller et al. | ................ | 235/375 |
| 2004/0166807 A1 * | 8/2004 | Vesikivi et al. | .............. | 455/41.2 |
| 2004/0257231 A1 * | 12/2004 | Grunes et al. | ............. | 340/572.1 |
| 2005/0110612 A1 * | 5/2005 | Carrender | ................... | 340/10.1 |
| 2005/0234778 A1 * | 10/2005 | Sperduti et al. | ............... | 705/22 |
| 2005/0246247 A1 * | 11/2005 | Lyon | ........................... | 705/28 |
| 2005/0246248 A1 * | 11/2005 | Vesuna | ......................... | 705/28 |

* cited by examiner

*Primary Examiner*—Tuan C To
(74) *Attorney, Agent, or Firm*—Nelson A. Blish

(57) ABSTRACT

A system (10) for viewing location marker data on a display (14) located in a vehicle (16) has a transponder (20) located on a structure (18) and a transmitter (22) located on the vehicle, which transmits a first signal (24). The transponder receives the first signal and transmits a second signal (26) with a first identification tag. A receiver (28) in the vehicle receives the second signal. A microprocessor (30) in the vehicle interprets the first identification tag and displays location marker data corresponding to the first identification tag on the display.

7 Claims, 5 Drawing Sheets

WIRELESS ADDRESS AND STREET NAME LOCATOR

FIELD OF THE INVENTION

This invention relates to a system for viewing location markers, and more particularly to a wireless system for viewing house numbers and street names displayed within a motor vehicle.

BACKGROUND OF THE INVENTION

It is difficult for many people to view street signs and house numbers from a distance. Darkness and inclement weather conditions can exacerbate the problem. Failure to read street signs or addresses can cause traffic delays, and in some cases, automobile accidents as drivers slow or stop while trying to read street signs and numbers. Other drivers must swerve to avoid the stopped car, or wait until the stopped car turns or moves on.

Inability to read location information is a significant problem for the elderly, whose visual acuity and night vision declines with age. It is therefore important for the safety and comfort of these and other drivers to provide a system whereby they can view street signs sufficiently in advance of intersections to prepare for a turn or change lanes. It is also important to see house numbers so that drivers can readily locate the address that they are seeking without stopping the car and walking to the house.

There have been several attempts to solve traffic related problems with advanced technology. Technology using Global Positioning Satellites (GPS) provides current location to drivers of vehicles having the GPS system, but these devices are relatively expensive. For example, U.S. Pat. No. 6,411,896 discloses a system to warn drivers of slow moving traffic and other traffic related problems. U.S. Pat. No. 6,405,126 discloses a system to preprogram destination information using magnetic strips on cards or radio transmissions. U.S. Pat. No. 6,278,936 discloses a data manager, which monitors vehicle location and transmits location information to vehicles on request. This data manager notifies the vehicle when it is within a specified distance of the destination. It also allows a user to monitor the progress of the vehicle headed toward the location. U.S. Pat. No. 6,560,529 discloses pattern recognition apparatus for reading road sign text in order to provide this information to a navigational system such as a GPS system. U.S. Pat. No. 6,836,724 discloses the use of a geographic database to report information about nearby road signs to a driver upon request, again following the overall GPS model. While such systems may be useful for providing information that helps the traveler to find a destination, they can require fairly elaborate equipment for solving the problem of locating a nearby street or building.

It is desirable to have an accurate, reliable, and inexpensive system whereby drivers of vehicles can easily determine street address numbers and street names during periods of reduced visibility or inclement weather without leaving their vehicles.

SUMMARY OF THE INVENTION

Briefly, according to one aspect of the present invention, there is provided a system for viewing location marker data on a display located in a vehicle comprising:

a transponder located on a structure;
a transmitter located on the vehicle which transmits a first signal;
wherein the transponder receives the first signal and transmits a second signal with a first identification tag;
a receiver in the vehicle which receives the second signal; and
a microprocessor in the vehicle which interprets the first identification tag and displays location marker data corresponding to the first identification tag on the display.

According to another embodiment of the invention, street name, street number, or other information is transmitted only upon authentication of the motor vehicle.

The present invention creates a locating system that is both quick and reliable. Using advances in technology that allow the transfer of information onto computer screens or other types of display, the age old problem of straining to see street signs or street address numbers is eliminated. Most importantly, this invention constitutes a significant advance in safety and will reduce the risk of vehicular accident for drivers searching for a destination.

The invention and its objects and advantages will become more apparent in the detailed description of the preferred embodiment presented below.

BRIEF DESCRIPTION OF THE DRAWINGS

FIG. 2 is a schematic block diagram of another embodiment of the present invention for identifying streets, intersections, and the like.

DETAILED DESCRIPTION OF THE INVENTION

The following description is directed in particular to elements forming part of, or in cooperation more directly with the system in accordance with the present invention. It is to be understood that elements not specifically shown or described may take various forms well known to those skilled in the art.

The apparatus of the present invention allows data to be encoded and stored at various location markers along a roadway. Location markers can be, for example, street addresses, street names, and roadway signs for landmarks. The apparatus of the present invention allows various types of location marker data to be displayed within a motor vehicle, wherein the location marker data itself is location-specific information that is obtained from a nearby site. This location-specific information, termed "location marker data" in the description that follows, includes information such as a street address or street name, for example, and may include other location-related information as well.

Figure 1:
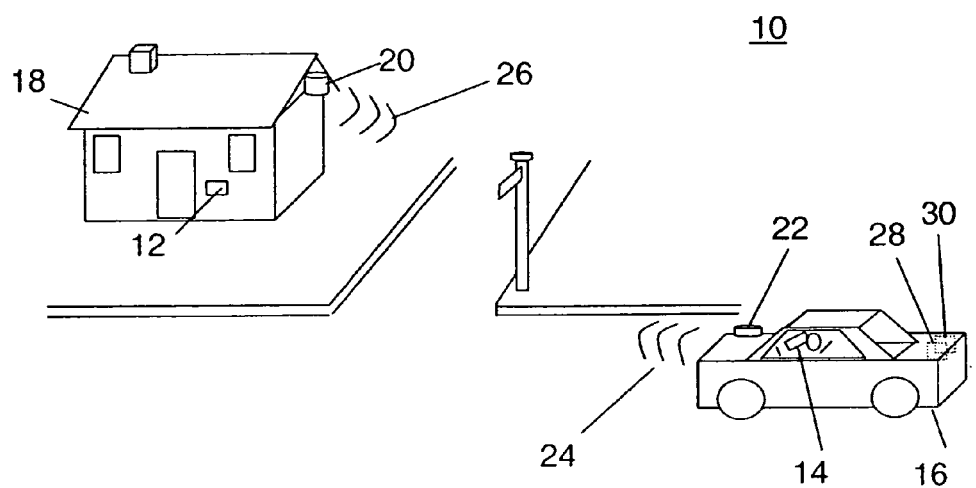
FIG. 1 is a schematic block diagram of a system according to the present invention.

Referring to FIG. 1 a system 10 is shown for viewing the street addresses 12 of a nearby building 18 on a display 14 located in a motor vehicle 16. A transponder 20 is located on building 18 and a transmitter 22 is located in motor vehicle 16. Transmitter 22 transmits a first signal 24 and transponder 20 receives first signal 24 and transmits a second signal 26 with a first identification tag. A receiver 28 in motor vehicle 16 receives second signal 26 and a microprocessor 30 in the vehicle interprets the first identification tag and displays a street address or other location marker data corresponding to the first identification tag on display 14.

The first identification tag may include other information in addition to street address data. For example, a name of one or more residents of building 18 may be provided, depending on information the owner or occupant of building 18 chooses to incorporate in the identification tag returned by transponder 20. In the case of a commercial building the first identification tag may include a name of one or more businesses located in building 18 along with other information. In the case of a private residence, the homeowner may choose to include the names of the individuals residing at that address.

Figure 3:
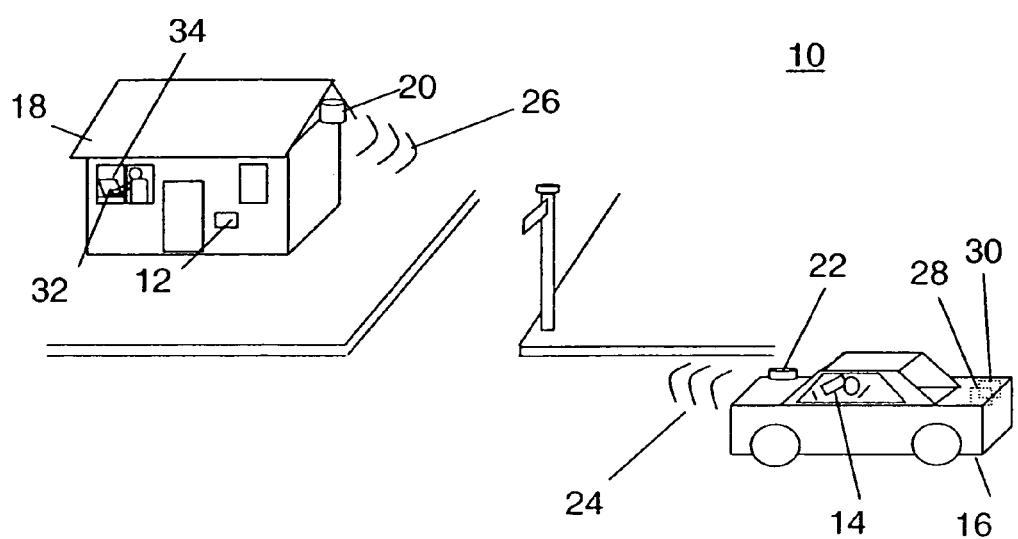
FIG. 3 is a schematic block diagram of an alternate embodiment in which security features are provided.

In another embodiment, shown in FIG. 3, first signal 24 from transmitter 22 comprises a second identification tag that includes vehicle identification information about motor vehicle 16. This second identification tag provides information to the owner of building 18 about motor vehicle 16, which is displayed on a display monitor 32. The owner of building 18 may program transponder 20 to transmit address, other information, or both, only to a select group of individuals or to owners of certain motor vehicles 16. In this case, address and other information is only transmitted back to motor vehicle 16 following authentication of the second identification tag. The information relative to building 18 or its occupants may be released according to a manual entry, at the discretion of a home owner, for example, or may be programmed in an automated system serving the home owners or other occupant of building 18.

Figure 5:
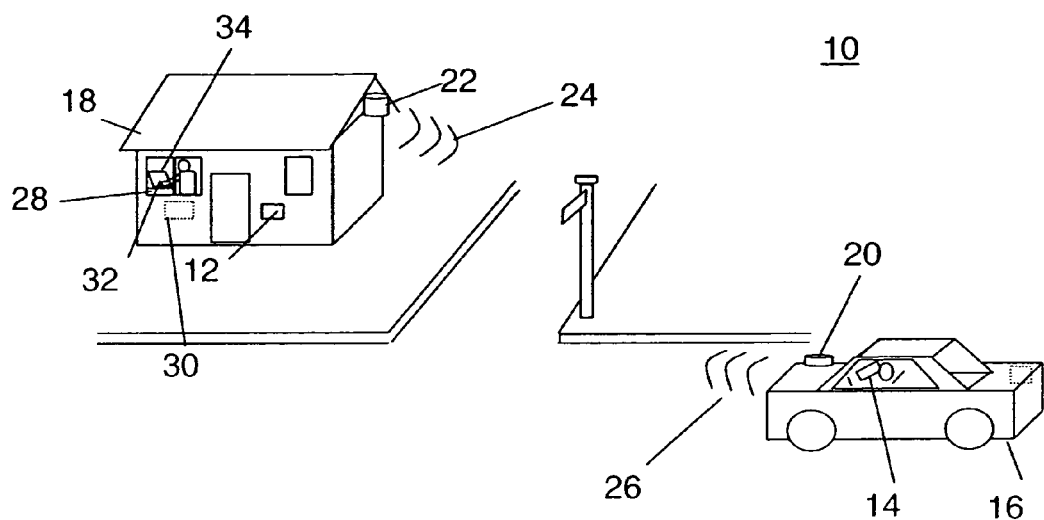
FIG. 5 is a schematic block diagram of an alternate embodiment in which the information transfer from the motor vehicle is of particular importance to a building occupant.

FIG. 5 shows another embodiment, in which transmitter 22 and receiver 28 are installed at building 18 and transponder 22 is installed at motor vehicle 16. Here, transmitter 22 sends out first signal 24 to elicit the response of second signal 26 from motor vehicle 16. Transmission may be initiated by a building occupant or may be automatically initiated, such as in response to a security system sensor, for example. This alternate arrangement could be used for sites where the identity of occupants of motor vehicle 16 is particularly important. Microprocessor 30 is also installed at building 18.

In yet another embodiment, an announcing subsystem 34 on or inside building 18 announces arrival of motor vehicle 16. If the second identification tag includes information on the occupants of motor vehicle 16 or on the vehicle owner, this information may also be included in the announcement.

Figure 4:
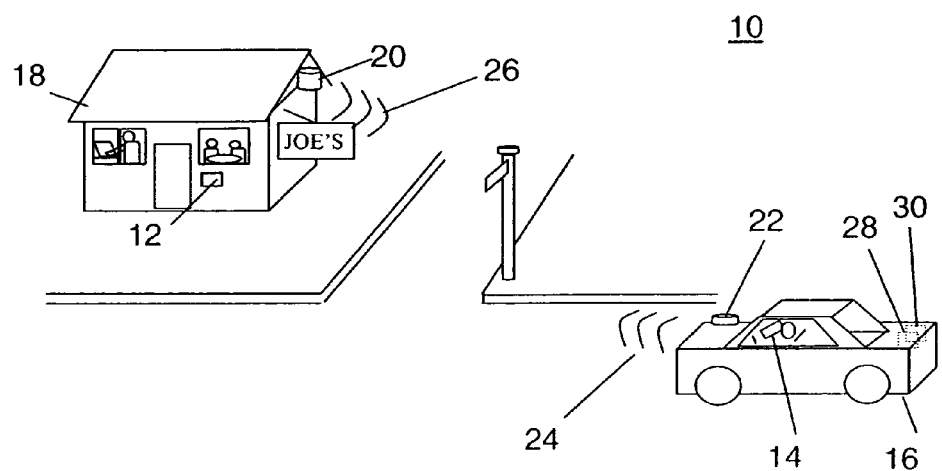
FIG. 4 is a schematic block diagram of an alternate embodiment in which a commercial establishment provides additional information.

In the case of a commercial building, as shown in FIG. 4, the first identification tag may also contain additional information for viewing on the vehicle's display 14. For example, the first identification tag may include the name of building 18, products sold at building 18, prices of products sold at building 18, and one or more phone number(s) for building 18 occupants or businesses. Other information may also be included in the information of the first identification tag.

Figure 2:
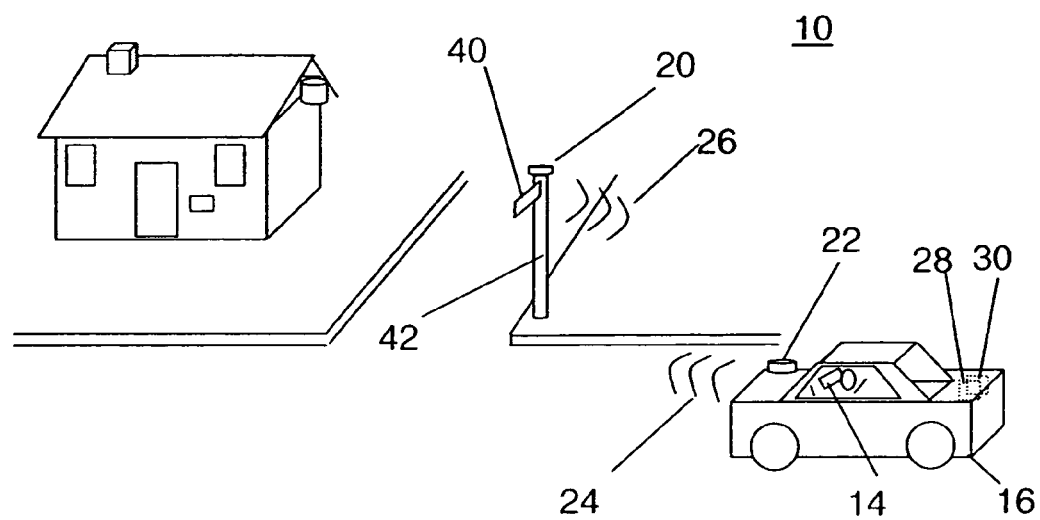

FIGS. 1, 3, and 4 show transponder 20 located on building 18 as one type of structure. In yet another embodiment of the invention, shown in FIG. 2, transponder 20 is located on a different type of structure. Here, transponder 20 is located on a street sign 42 or other type of road sign and transmitter 22 is located on motor vehicle 16. Transmitter 22 sends first signal 24 and transponder 20 receives the first signal and sends a second signal 26 in response, with a first identification tag. Receiver 28 on motor vehicle 16 receives the second signal; and microprocessor 30 interprets the first identification tag and displays, on display 14, street name 40 or other road sign-related information corresponding to the first identification tag.

In addition to street name 40, the first identification tag may contain additional location marker data, such as city name, county name, or directions to service areas or emergency facilities such as hospitals, for example. Motor vehicle 16 may transmit a second identification tag as discussed above, which includes vehicle information or information about the owner of motor vehicle 16. This information may be recorded for security purposes, or some or all components of the available information may be restricted for transmission to only authorized individuals. For example, in a private community, street name information, or some other data, may be restricted to permit transmission only to motor vehicles 16 owned by residents of the private community.

In another embodiment, system 10 also includes information on the identity of one or more occupants of motor vehicle 16. For example, some vehicle prototypes incorporate biometric data and use this data to allow only certain individuals to start the vehicle. Thus, information about the individual who is driving motor vehicle 16 may be transmitted to building 18, in addition to, or in lieu of information about motor vehicle 16. The name of the registered owner of the vehicle may also be transmitted. Information about the individual or about the driver of motor vehicle 16 may be used to provide other security functions, such as access to garage or parking areas.

Display 14 within motor vehicle 16 may be any of a number of types of graphic display suitable for showing address numbers and other information. Display 14 may employ emissive components, such as light emitting diodes (LEDs) or organic light emitting diodes (OLEDs) for example. Display 14 could also be a liquid crystal device (LCD). Display 14 could be portable or could be mounted on the dashboard of motor vehicle 16 or could be mounted at some other suitable location for easy viewing of reported information. In one embodiment, display 14 is a "heads-up" display (HUD) that displays information on the windshield itself, without obscuring the driver's view of the road. Examples of heads-up displays adapted for automotive use include those provided by Delphi Delco Electronics Systems, Kokomo, Ind.

There are a number of options for embodiments of the wireless communication components, that is, of transponder 20, transmitter 22, and receiver 28. These components could be dedicated devices or could use wireless communication devices already installed in motor vehicle 16 and used for other purposes. For example, the type of intermediate-range transponder apparatus currently used in trucking industry applications for inventory or for weighs or toll stations could be used. The transponder could also be a radio frequency identification (RFID) tag. Transmitter 22 and receiver 28 could be packaged into a single transceiver module. Microprocessor 30 could be any of a number of types of dedicated processors; alternately, the logic functions of microprocessor 30 could be performed by software running on a control logic processor that also performs other functions within motor vehicle 16 or within building 18. Response information provided in first and second identification tags may be encoded at transmitter 22 and transponder 20 apparatus, using message-encoding techniques familiar to those skilled in the wireless communications arts.

In addition to homeowners, businesses may find system 10 of the present invention to be particularly helpful. A customer may be searching for a particular place of business or may be searching for a particular type of business establishment. For example, a customer may be interested in finding a suitable nearby restaurant anywhere along the road ahead. In such a case, the content of first signal 24 from transmitter 22 would be encoded to indicate this interest. Transponders 20 at restaurants would respond to first signal 24, as described for the embodiment of FIG. 1 above; on the other hand, transponders 20 for bowling alleys or gas stations would ignore first signal 24 having such an encoding. This would extraneous information appearing on the automobile display.

A business adapting the present invention could also provide various supplementary data about the business in the response content of first identification tag. For example, a restaurant may provide a message about menu specials, serving hours, wine list, etc. First identification tag could include a hypertext link to a universal resource locator (URL) that gives additional information about the business. This would enable a vehicle occupant to access a web page giving more information about a business.

In general, the present invention utilizes wireless two-way communication between a device located on a motor vehicle and a device located on a stationary structure, such as building 18, street sign 42, or some other road sign such as an informational sign or a landmark. Unlike GPS and similar systems that use external reference points for obtaining location information, the system of the present invention obtains information encoded specifically about a structure, or about a motor vehicle, or its occupants, directly from the source.

The apparatus of the present invention would be compatible for working in conjunction with other automated mapping tools becoming available to today's automobile driver. For example, a display component serving an in-car GPS mapping system could be adapted to serve as display 14 for system 10 of the present invention.

Various operational controls could be provided to users of system 10, allowing it to be adapted to the needs of those in motor vehicle 16. For example, one type of control would confine transmission broadcast by transmitter 22 to one side of the street, useful for environments such as a divided highway. Distance adjustments may help narrow the range of responding locations to transmissions from transmitter 22.

In another embodiment, system 10 provides voice enablement. Numeric addresses or key words spoken by those in motor vehicle 16 enable various transmission and search functions controlled by microprocessor 30. In addition, audible response may provided to augment display of address and other information, or in lieu of visual display.

Additional embodiments not specifically discussed are included within the scope of this invention. One feature that could be readily used with the system of the present invention is a distance-detection feature. Using this feature, for example, display 14 may show the distance to building 18. Alternatively, display monitor 32 in building 18 may show the distance to motor vehicle 16 as it approaches. Microprocessor 30 may be any of a number of types of control logic components that are programmable for control of the various devices used for information transmission, reception, and decoding. This could also include software executing on personal computers or computer workstations.

The invention has been described in detail with particular reference to certain preferred embodiments thereof, but it will be understood that variations and modifications can be effected within the scope of the invention.

PARTS LIST 10 system for viewing street addresses
12 number on the building
14 display
16 motor vehicle
18 building
20 transponder
22 transmitter
24 first signal
26 second signal
28 receiver
30 microprocessor
32 monitor
34 announcing subsystem
40 street name
42 street sign

What is claimed is:

1. A system for viewing location marker data on a display located in a vehicle comprising:
   a transponder located on a structure;
   a transmitter located on said vehicle which transmits a first signal;
   wherein said transponder receives said first signal and transmits a second signal with a first identification tag;
   a receiver in said vehicle which receives said second signal;
   a microprocessor in said vehicle which interprets said first identification tag and displays location marker data corresponding to said first identification tag on said display;
   wherein said structure is a building and said first identification tag comprises a name of at least one occupant of said building; and
   wherein said first signal comprises a second identification tag.

2. A system for viewing location marker data on a display located in a vehicle comprising:
   a transponder located on a structure;
   a transmitter located on said vehicle which transmits a first signal with a first identification tag;
   wherein said transponder receives said first signal and transmits a second signal with a second identification tag;
   a receiver in said vehicle which receives said second signal;
   a microprocessor in said vehicle which interprets said second identification tag and displays location marker data corresponding to said second identification tag on said display; and
   wherein said first identification tag comprises vehicle identification information.

3. A system for viewing location marker data as in claim 2 wherein said transponder transmits said second signal only on authentication of said first identification tag.

4. A system for viewing location marker data on a display located in a vehicle comprising:
   a transponder located on a structure;
   a transmitter located on said vehicle which transmits a first signal;
   wherein said transponder receives said first signal and transmits a second signal with a first identification tag;
   a receiver in said vehicle which receives said second signal;
   a microprocessor in said vehicle which interprets said first identification tag and displays location marker data corresponding to said first identification tag on said display;
   wherein said structure is a building and said first identification tag comprises a name of at least one occupant of said building; and
   wherein said first identification tag contains additional information selected from a group comprising a name of said structure, street address, products sold at said structure, prices of products sold at said structure, at least one phone number for said structure.

5. A system for viewing location marker data on a display located in a vehicle comprising:
   a transponder located on a structure;
   a transmitter located on said vehicle which transmits a first signal;
   wherein said transponder receives said first signal and transmits a second signal with a first identification tag;

a receiver in said vehicle which receives said second signal;

a microprocessor in said vehicle which interprets said first identification tag and displays location marker data corresponding to said first identification tag on said display; and wherein an announcing subsystem in said structure announces the proximity of said vehicle.

6. A system for viewing location marker data on a display located in a vehicle comprising:

a transponder located on a structure;

a transmitter located on said vehicle which transmits a first signal;

wherein said transponder receives said first signal and transmits a second signal with a first identification tag;

a receiver in said vehicle which receives said second signal;

a microprocessor in said vehicle which interprets said first identification tag and displays location marker data corresponding to said first identification tag on said display;

wherein said structure is a building and said first identification tag comprises a name of at least one occupant of said building; and wherein the display appears on a windshield of the vehicle.

7. A system for viewing location marker data on a display located in a vehicle comprising:

a transponder located on a structure;

a transmitter located on said vehicle which transmits a first signal;

wherein said transponder receives said first signal and transmits a second signal with a first identification tag;

a receiver in said vehicle which receives said second signal;

a microprocessor in said vehicle which interprets said first identification tag and displays location marker data corresponding to said first identification tag on said display;

wherein said structure is a building and said first identification tag comprises a name of at least one occupant of said building; and wherein the first identification tag comprises a link to a URL.

* * * * *